United States Patent [19]

Pitts, Jr. et al.

[11] 4,144,754
[45] Mar. 20, 1979

[54] MULTIPHASE FLUID FLOW METER

[75] Inventors: Robert W. Pitts, Jr.; Dan M. Arnold, both of Houston, Tex.

[73] Assignee: Texaco Inc., New York, N.Y.

[21] Appl. No.: 779,117

[22] Filed: Mar. 18, 1977

[51] Int. Cl.² .............................................. G01F 1/88
[52] U.S. Cl. .................................... 73/205 D; 73/214
[58] Field of Search ................. 73/194 M, 205 D, 214

[56] References Cited

U.S. PATENT DOCUMENTS

| | | | |
|---|---|---|---|
| 3,067,611 | 12/1962 | Bowers et al. | 73/214 |
| 3,425,274 | 2/1969 | Clement et al. | 73/194 M |

FOREIGN PATENT DOCUMENTS 954218  4/1964  United Kingdom ...................... 73/214

OTHER PUBLICATIONS

Instruments & Control Systems, vol. 33, Feb. 1960, pp. 277-280.

Primary Examiner—Charles A. Ruehl
Attorney, Agent, or Firm—Thomas H. Whaley; Carl G. Ries; Henry C. Dearborn

[57] ABSTRACT

A fluid flow meter. It employs measurements related to centrifugal flow of the fluids therethrough. There is a complete loop and means for measuring the differential pressure of the fluid in the loop between the inside and outside of the fluid stream near the middle of the loop. Also there is means for measuring the density of the fluid flowing through the loop. By correlating the results, the rate of fluid flow through the meter may be measured.

15 Claims, 4 Drawing Figures

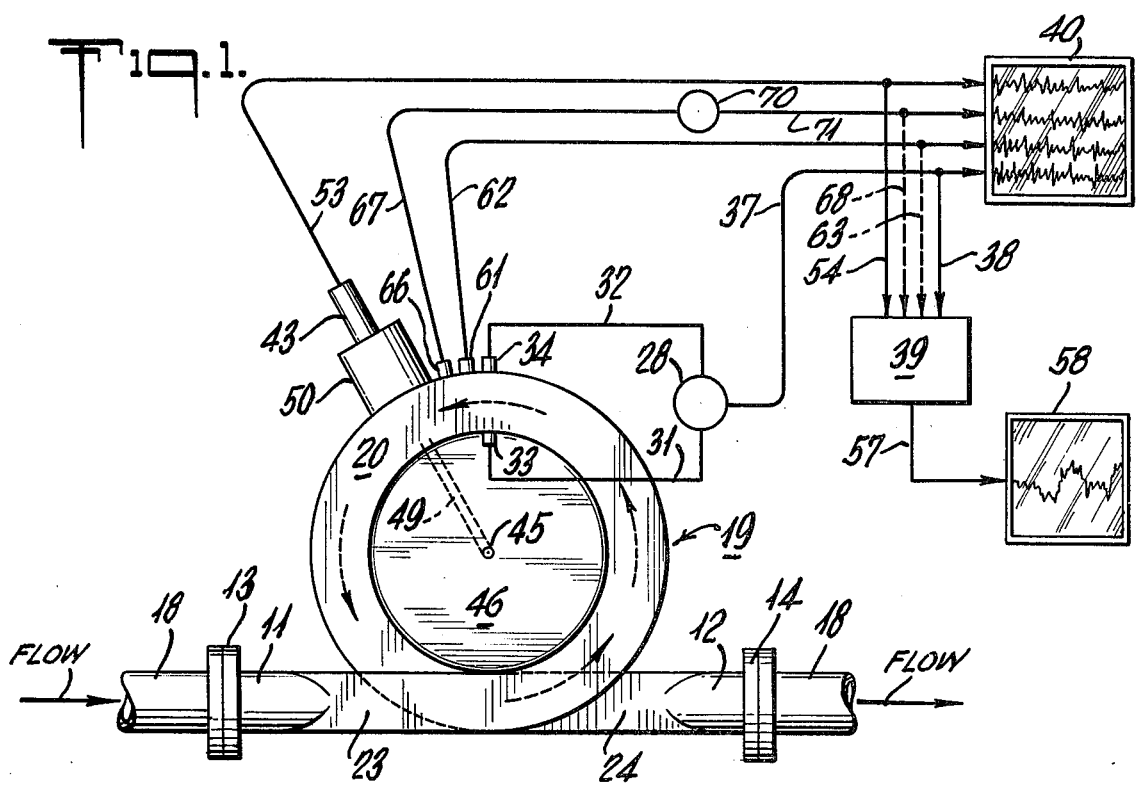

MULTIPHASE FLUID FLOW METER

BACKGROUND OF THE INVENTION

1. Field of the Invention

This invention concerns fluid flow meters, in general. More specifically, it deals with a multiphase fluid type of fluid flow meter.

2. Description of the Prior Art

While it has been proposed that centrifugal flow may be employed in measuring the rate of flow of fluids, a known proposal published in February 1960 required knowledge of the density of the fluid flowing through the meter. Consequently, it was not applicable to fluids of unknown density, or to fluids having mixed phases of unknown proportions. That prior proposal was set forth in an article by J. P. Cortelyou entitled Centrifical Flow Measurement. It was published in Instruments and Control Systems magazine, Volume 33, the February 1960 issue at pages 276–280.

It is an object of this invention to provide a multiphase fluid flow meter which employs the centrifugal flow principles.

Another object of the invention is to provide a fluid flow meter that will handle mixed or multiphase fluids having a wide range of densities. Also, to do so with good accuracy and with no necessity for maintaining the density of the flowing fluid constant.

SUMMARY OF THE INVENTION

Briefly, the invention concerns a multiphase fluid flow meter. It comprises a conduit for said fluid to flow therethrough, and said conduit includes a loop for subjecting said fluid to centrifugal force. The meter also comprises means for measuring the pressure differential between the inside and outside radii on said loop, and means for measuring the density of fluid flowing through said loop. The total combination is such that the rate of fluid flow through said meter may be measured.

Again briefly, the invention concerns a multiphase fluid flow meter, and it comprises an inlet and an outlet, as well as a conduit for said fluid to flow therethrough. It has a constant cross sectional area, and it is connected between said inlet and said outlet. The said conduit includes a 360° circular loop for subjecting said fluid to centrifugal force. The said conduit also includes tangential sections between the ends of said loop and said inlet and outlet respectively. The said tangential sections are straight with a radius of curvature of at least as great as two diameters of said loop. The meter also comprises means for measuring the pressure differential between the inside and outside radii on said loop, at the middle of said loop, and means for measuring the density of fluid flowing through said loop. The latter means comprises a gamma ray source, and a block of lead filling the space inside of said loop and surrounding said gamma ray source, except for a radial passage. The radial passage is for directing gamma rays from said gamma ray source across the fluid flowing through said loop, at a location near the middle of said loop circle. The density measuring means also comprises a sintillation detector crystal having its input collimated with lead and in alignment with said radial passage. It is located outside of said loop. The meter also comprises means for measuring the temperature of fluid flowing through said loop, and means for measuring the pressure of fluid flowing through said loop. The meter also comprises means for correlating said measurements and parameters of said meter, for indicating the volume flow rate of fluid flowing therethrough.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic illustration showing a side elevation of a meter according to the invention, and including various measuring elements which are associated therewith;

FIG. 2 is an end elevation of the meter illustrated in FIG. 1;

FIG. 3 is a schematic perspective view illustrating a meter loop for describing the theory involved; and FIG. 4 is an enlarged cross section, taken at the top of the loop of FIG. 3.

DESCRIPTION OF THE PREFERRED EMBODIMENT

In the petroleum industry there are many applications for multiphase flow meters. For example, it is useful to have continuous monitoring of multiphase flow at different points such as the well head, in gathering lines, and at gas-oil separator units. A meter according to this invention has the advantages of being simple yet reliable and accurate as well as relatively inexpensive. Also, the physical dimensions of this meter are relatively small.

FIGS. 1 and 2 illustrate the basic features of a multiphase flow meter according to the invention. It will be observed that the meter has an inlet 11 and an outlet 12. These have flanges 13 and 14, respectively, for coupling the meter into a flow line 18 which carries the fluid that is to have its flow rate measured.

The inlet 11 is at one end of a conduit 19 which includes a 360° circular loop 20. This loop will subject fluid flowing therethrough to centrifugal force. The conduit 19 also includes tangential sections 23 and 24 which connect the ends of the loop 20 with the inlet 11 and the outlet 12, respectively.

The inlet and outlet 11 and 12 are in line with one another vertically, as viewed in FIG. 1. And, they are only offset from one another horizontally as little as possible. Thus, the adjacent sides of the sections 23 and 24 are in close contact with one another as shown in FIG. 2.

In order to have uniform flow into the loop of the meter, the tangential sections 23 and 24 are made as straight as possible with the permissable curvature being that having a radius at least as great as two diameters of the loop circle 20.

There is a pressure-differential measuring instrument 28 for measuring the difference in pressure between the inside and outside radii of the loop 20 of the conduit 19. This instrument might take various forms such as a commercially available instrument manufactured by Rosemount Inc. which is designated as the Model 1151 DP differential pressure transmitter. It employs a sensing diaphragm (not shown) which has fluid pressures applied from fluid pressure connections 31 and 32 that go from the instrument 28 to fluid taps 33 and 34, respectively. These taps are schematically indicated in FIG. 1. They are located on the inside and outside of the loop 20, at the top thereof.

The instrument 28 has an electrical output signal that is in accordance with the pressure differential readings from the fluid connections 31 and 32. The electrical signal is transmitted over electrical circuit connections 37 and 38 to a microcomputer unit 39. The signal may also go to a recorder 40 for maintaining a record of the pressure differential being measured.

In order to measure the density of the fluid which is flowing through the loop 20, there is a scintillation detector 43 that measures the gamma ray penetration through the fluid flowing in the loop 20. In making this density measurement, the arrangement includes a gamma ray source 45, e.g. 1.3 millicuries of Cesium 137. The radiation from this source is collimated by having a block of lead 46 which fills the space inside of the loop 20 and has sufficient thickness to contain the radiation except for a radial passage 49. Passage 49 (indicated in dashed lines) directs the gamma rays across the radius of the path of the fluid flowing in the loop 20.

The scintillation detector 43 has its input collimated by a lead sheath 50. This column is, of course, in alignment with the radial passage 49, but it is located physically on the outside of the loop 20. The detector 43 has a crystal (not shown) that is coupled to a photo multiplier tube (not shown), all within the detector 43. Such detector may be one like that manufactured by Bicron Corp. of Newberry, Ohio which is designated as a scintillation detector. It will be understood that the crystal may be a sodium iodide crystal doped with thallium, and in its use with this invention it will be biased to count only primary (unscattered) gamma radiation that is emitted by the source 45. Such primary gamma radiation is determined by the count rate of the detector 43 and this will have a direct relationship to the density of the fluid in the path of the collimated gamma rays across the loop 20.

The signals which represent the count rate, and consequently the density of the fluid in loop 20 are transmitted from the detector 43 over electrical circuit connections 53 and 54 to the microcomputer unit 39. Here the differential pressure signals are related to the density signals which are determined by the gamma ray count, and the volume flow rate is determined.

The foregoing steps of relating the indicated signals, may be in accordance with the following equation. It has been derived in accordance with the principles noted by the above mentioned publication concerning centrifical flow measurement. Thus, the general theory developed by Cortelyou provides a basis for the expression which relates the pressure differential between the inside and outside of the loop having a radius R, to fluid having a density $\rho$ flowing at a volume flow rate V, to be:

$$\Delta P = \rho V^2 / gRd \quad (1)$$

In that expression d and R are dimensions of the loop 20 as indicated in FIGS. 3 and 4. Also, g is the acceleration of gravity. The equation (1) may be solved for V which yields the equation:

$$V = (\Delta P gRd^3/\rho)^{\frac{1}{2}} \quad (2)$$

It will be appreciated that the indicated flow rate will be provided as an output signal from the unit 39. This unit 39 may, of course, take various forms. However a unit found very satisfactory is a microprocessor designated KIM-1 by the manufacturer MOS Technology Inc. of 950 Rittenhouse Road, Norristown, Pa. 19401.

The density $\rho$ of the fluid is measured by the gamma ray densitometer as indicated above. It is related to the primary gamma radiation count rate as recorded by the detector 43, in accordance with the equation:

$$C = C_o e^{-n\rho x} \quad (3)$$

Wherein:
$C_o$ = the count rate recorded by the detector when the loop is filled with air;
$C$ = the count rate recorded by the detector when the loop is filled with the fluid being measured;
$n$ = the attenuation coefficient of the primary gamma radiation;
$X$ = the effective distance traversed by the primary gamma radiation;
$\rho$ = the bulk density of the fluid; and
$e$ = the natural base of logarithms.
Solving equation (3) for $\rho$ yields:

$$\rho = [\log_e (C_o/C)]/nx \quad (4)$$

Since the terms on the right hand side of equation (4) are either known, or determined during calibration of the densitometer, or measured, the bulk density may be continuously determined. Then, substituting equation (4) into equation (2) yields:

$$V = [\Delta P \cdot g \cdot R \cdot d^3 \cdot n \cdot x / \log_e (C_o/C)]^{\frac{1}{2}} \quad (5)$$

Consequently it will be understood by one skilled in the art that the unit 39 will provide an output signal representing the volume flow rate over an electrical circuit connection 57 to a recorder 58. The recorder, of course, makes a record of the volume flow rate of the fluid.

If the fluid flowing through the meter is a mixture of liquid and free gas, it is helpful to monitor the temperature and pressure of the flowing fluid in order to compute the density of the gas. Consequently, there is a temperature sensing element 61 that has an electrical circuit connection 62 to the recorder 40. It may also have an electical circuit connection 63 (shown in dashed line) to the micro-computer unit 39.

Similarly, there is a fluid tap 66 that has a fluid pressure connection 67 leading to a pressure meter 70. This may be one like an instrument manufactured by Rosemount Inc., the same manufacturer as that of the differential pressure instrument 28, whose address is P.O. Box 35129, Minneapolis, Minn. 55435. The pressure instrument 70 has an electrical signal output which is transmitted to the recorder 40 via an electrical circuit connection 71. It also may have a connection 68 (shown in dashed line) going to the computer 39.

It will be noted that the flow meter according to this invention is particularly useful in connection with obtaining such quantities of interest as gas/liquid ratio, or in the case of fluids containing no free gas, the oil/water ratio.

It will be appreciated that various instruments may be employed in making the temperature and gauge-pressure measurements as well as the density measurement. Also, there are various computer units or arrangements that might by employed.

While a particular embodiment of the invention has been described above in considerable detail in accordance with the applicable statutes, this is not to be taken as in any way limiting the invention but merely as being descriptive thereof.

We claim:

1. Multiphase fluid flow meter, comprising
   a conduit for said fluid to flow therethrough,
   said conduit including a circular loop for subjecting said fluid to centrifugal force and forming a space inside of said loop,
   means for measuring the pressure differential between the inside and outside radii on said loop,
   means for measuring the average density taken radially across the fluid flowing through said loop and,
   means for determining the rate of fluid flow through said meter by combining said measurements.

2. Multiphase fluid flow meter according to claim 1, wherein
   said average density measuring means, comprises a gamma ray densitometer.

3. Multiphase fluid flow meter according to claim 2, wherein
   said gamma ray densitometer, comprises a gamma ray source,
   means for collimating said source on a radial path relative to said loop, and
   means for detecting said collimated gamma rays after passing through the fluid flowing through said loop.

4. Multiphase fluid flow meter according to claim 3, wherein
   said collimating means, comprises a block of lead filling the space inside of said loop, and
   a radial passage for directing gamma rays from said gamma ray source.

5. Multiphase fluid flow meter according to claim 4, wherein
   said gamma ray detecting means, comprises a scintillation detector crystal having its input collimated with lead in alignment with said radial passage and located outside of said loop.

6. Multiphase fluid flow meter according to claim 5, wherein
   said conduit loop comprises a 360° circle.

7. Multiphase fluid flow meter according to claim 6, also comprising
   means for measuring the temperature of fluid flowing through said loop, and
   means for measuring the pressure of fluid flowing through said loop.

8. Multiphase fluid flow meter according to claim 4, wherein
   said conduit loop comprises a 360° circle.

9. Multiphase fluid flow meter according to claim 8, also comprising
   means for measuring the temperature of fluid flowing through said loop, and
   means for measuring the pressure of fluid flowing through said loop.

10. Multiphase fluid flow meter according to claim 3, wherein
    said conduit loop comprises a 360° circle.

11. Multiphase fluid flow meter according to claim 10, also comprising
    means for measuring the temperature of fluid flowing through said loop, and
    means for measuring the pressure of fluid flowing through said loop.

12. Multiphase fluid flow meter according to claim 2, wherein
    said conduit loop comprises a 360° circle.

13. Multiphase fluid flow meter according to claim 12, also comprising
    means for measuring the temperature of fluid flowing through said loop, and
    means for measuring the pressure of fluid flowing through said loop.

14. Multiphase fluid flow meter according to claim 1, wherein
    said conduit loop comprises at 360° circle.

15. Multiphase fluid flow meter, comprising
    an inlet and an outlet,
    a conduit for said fluid to flow therethrough and having a constant cross sectional area and connected between said inlet and said outlet,
    said conduit including a 360° circular loop for subjecting said fluid to centrifugal force,
    said conduit also including tangential sections between the ends of said loop and said inlet and outlet respectively,
    said tangential sections being straight with a radius of curvature of at least as great as two diameters of said loop,
    means for measuring the pressure differential between the inside and outside radii on said loop at the middle of said loop,
    means for measuring the density of fluid flowing through said loop, comprising
       a gamma ray source,
       a block of lead filling the space inside of said loop and surrounding said gamma ray source except for a radial passage for directing gamma rays from said gamma ray source across the fluid flowing through said loop at a location near the middle of said loop circle, and
       a scintillation detector crystal having its input collimated with lead in alignment with said radial passage and located outside of said loop,
    means for measuring the temperature of fluid flowing through said loop,
    means for measuring the pressure of fluid flowing through said loop, and
    means for correlating said measurements and parameters of said meter for indicating the volume flow rate of fluid flowing therethrough.

* * * * *